O. F. Monfort,

Tile Machine.

No. 106,390. Patented Aug. 16, 1870.

Witnesses:
A. Dinnensdorf
Alex F. Roberts

Inventor:
O. F. Monfort
per Mmm
Attorneys.

United States Patent Office.

OSCAR F. MONFORT, OF DEARBORN, MICHIGAN.

Letters Patent No. 106,390, dated August 16, 1870.

IMPROVED TILE-CUTTING MACHINE.

The Schedule referred to in these Letters Patent and making part of the same.

*To all whom it may concern:*

Be it known that I, OSCAR F. MONFORT, of Dearborn, in the county of Wayne and State of Michigan, have invented a new and improved Tile-cutting Machine; and I do hereby declare that the following is a full, clear, and exact description thereof, which will enable others skilled in the art to make and use the same, reference being had to the accompanying drawing forming a part of this specification.

This invention relates to improvements in machines for cutting the tile as it issues from the tile-machine, in continuous form, into short sections, and consists in the application to the carrying-table, between two endless belts, of a fine wire or steel-plate cutter, stretched between an arm and a shaft, by which the shaft is revolved, so as to be revolved around the shaft and forced through the tile while moving along, the cutter being arranged to move with the tile while cutting, and back again after cutting, and the arm which supports the swinging end of the cutter being arranged to pass between the cut sections.

The invention also comprises a carrying-table for passing the cut pieces beyond the arm which supports the cutter suspended on the shaft, and held in position by a weight, so that the arm which carries the cutter may pass around it.

The invention also comprises apparatus for moving the cutter along with the tile when cutting, and back again.

Figure 1:
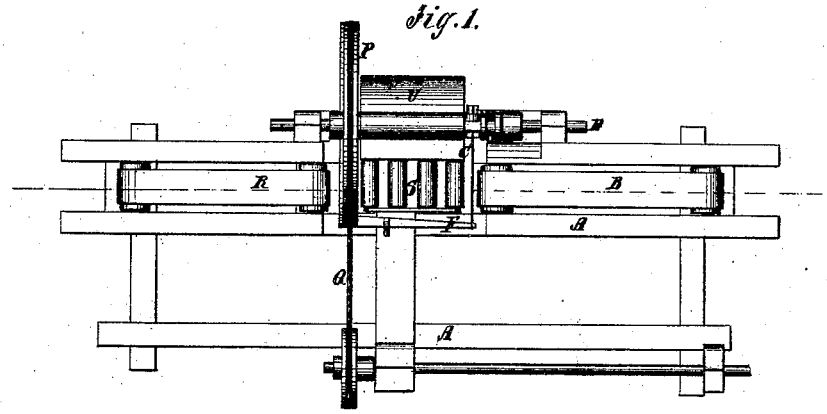
Figure 2:
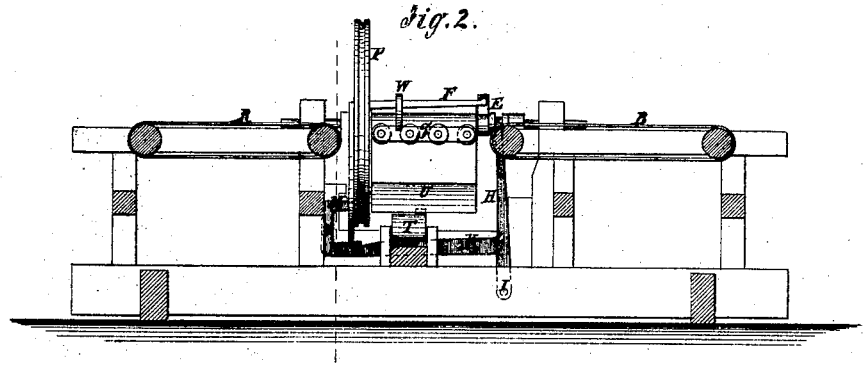
Figure 3:
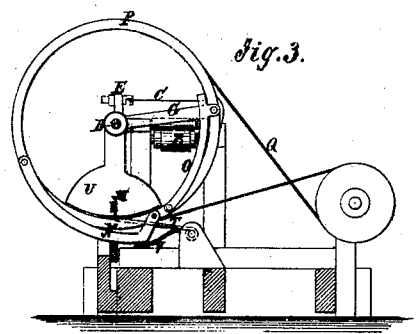

Figure 1 is a plan view of my improved machine;
Figure 2 is a side elevation of the same; and
Figure 3 is a transverse section of the same.

Similar letters of reference indicate corresponding parts.

A represents a suitable table or frame, on which is an endless belt, B, receiving the tile in continuous form from the tile-making machine, and carrying it along to the cutter C, which consists of a fine steel wire or other thin plate of hardened steel, as a watch-spring, stretched between a shaft, D, or an arm, E, thereon, and the end of an arm, F, supported in a line parallel with the shaft D, by a radial arm, G, mounted on the shaft.

This shaft is arranged at the side of the table, parallel with the carrying-belts, and the arm G moves across the path of the tile when the shaft is revolved, carrying the arm F down on the opposite side, causing the cutter to cut through the tile.

The speed of the carrying-belt and the cutter-carrying arm is so arranged that the cutter makes one revolution while the tile is carried forward the length of one section.

In order to cut the tile off square, it is necessary that, while the cutter is in contact with the tile, it should move with it. For this reason the shaft D, which carries the arm G F, is mounted so as to slide in its bearings, and a shifting-bar, H, is connected to it, for moving it forward and back.

This bar is pivoted at I to the bed-frame, and has a long arm, K, extending along under the shaft, and bent upward and backward, as shown at L M. This is moved down by a cam, N, and up by a cam, O, attached to a pulley rim, P, attached to the arm G for the purpose, and also for imparting rotary motion to the shaft by a belt, Q.

The cam N, which strikes on the top of the arm K, forces it down, and thereby slides the shaft D and cutter along with the tile. The adjustment of the cam is such that it strikes the lever at the time the cutter comes in contact with the tile.

The cam O acts upon the under side of the part M of the lever, and raises it, throwing the shaft and cutter back, immediately after the cutter passes below the tile.

After the sections are cut off, it is necessary to carry them away, also to separate them, to allow the arm G to pass. For this purpose I provide another carrying-belt, R, and cause it to run faster than the belt B does, the said belt being arranged to receive and draw a section away from the path of the arm, just previous to the passage of the said arm.

This arm passes a little more than the length of one section from the path of the cutter, so that there is always one section between them. This section must be supported on a table around which the arm F can pass. Therefore the said table S is suspended from the shaft D, and is held in position while the cutting is done, by a bar, T, which catches into a weight, U; and is held in contact by a spring, V, and so arranged that it can be forced down to let the arm pass, by a cam, W, thereon.

While the arm is passing under this weight, and the catch is disconnected, the table is held in position by the weight.

Immediately after the arm F passes under the weight, the catch T engages it again, and holds it firmly.

The said table is provided with rollers, to reduce the friction of the tile moving over it, which are forced along by the uncut tile on the belt B.

Other arrangement of means may be employed for moving the cutter forward and back in the direction of the movement of the tile, as described, and the shaft may be revolved by means other than the wheel P, in which case it might be dispensed with.

Having thus described my invention,
What I claim as new, and desire to secure by Letters Patent, is—

1. The arrangement of the steel cutter C, constructed as set forth, between the arms E and F, and transversely to the endless tile-carrier B, as and for the purpose described.

2. The combination, with the tile-cutter and the carrying-belts B R, of the weighted table S and spring catch T, substantially as specified.

3. The combination, with the shaft D, arm G, and wheel-tine E, of the shifting-arm H K and cams N O, substantially as specified.

OSCAR F. MONFORT.

Witnesses:
 MARTIN VROOMAN,
 E. S. SNOW.